United States Patent Office 2,781,351
Patented Feb. 12, 1957

2,781,351
CERTAIN IMIDAZOLINE ALKANOIC ACID SALTS OF CERTAIN DETERGENT ACIDS AND PROCESS

Hans S. Mannheimer, New York, N. Y.

No Drawing. Application November 21, 1956,
Serial No. 623,526

13 Claims. (Cl. 260—309.6)

This invention relates to novel compositions and to methods for producing them. In one of its more specific aspects the invention is directed to methods of making and to novel derivatives of metal salts of substituted quaternary hydroxy cycloimidinic acid metal alcoholates, examples of which are disclosed in my U. S. Patent 2,528,378 and which I shall hereafter refer to herein as "cycloimidates."

Said "cycloimidates" have been found useful because they have high detergent, foaming, wetting, emulgating, emulsifying, dispersing bacteriastatic, bacteriacidal, fungicidal, and deodorizing characteristics. They are highly water-soluble, stable in aqueous solutions in the pH range of 1–14 and are not precipitated out of solution by the salts normally present in hard water. They are non-vesicant and non-toxic to human and animal life and may be introduced into the blood stream without ill effects. They are surface active agents and serve as excellent synthetic detergents, softeners and dye assistants in the textile and related fields and especially in washing and cleansing of cotton fibers and textiles. They may also be employed as therapeutic agents and are especially useful as germicides, fungicides and antisepticides.

Said "cycloimidates" have the following general Formula I:

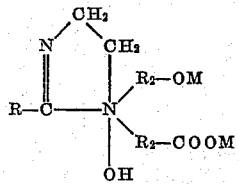

in which R is the organic radical which if connected to a carboxyl group provides a monocarboxylic acid and said radical contains at least 4 carbon atoms; $R_2$ is an aliphatic hydrocarbon group having 1 to 4 carbon atoms, such as —$CH_2$—, —$C_2H_4$—, —$C_3H_6$—, and —$C_4H_8$— or any of the aforesaid groups, any one or more of whose hydrogens may be hydroxy substituted, illustrative examples of which are —$CH_2$—CHOH—$CH_2$—, —$CH_2$—CHOH—CHOH—$CH_2$—, or any one of the aforesaid groups either unsubstituted or hydroxy substituted and having a single ether (—O—) or keto (—O—) linkage therein, illustrative examples of which are —$C_2H_4$—O—$C_2H_4$—, —$CH_2$—CHOH—O—$C_2H_4$—, —$CH_2$—O—$CH_2$; both M radicals may be the same as or different from each other and each is a metal and preferably an alkali metal and for most purposes is sodium or potassium.

The methods for producing said "cycloimidates" and illustrative examples of a number of specific "cycloimidates" are disclosed in said patent.

Prior to this invention, it was known that cationic surface active agents and anionic surface active agents when together in aqueous solution resulted in the production or formation of water insoluble compounds; and that adding an anionic surface active agent to an aqueous solution of another anionic surface active agent resulted in a mere physical combination of said agents and that no reaction would occur between them.

Said "cycloimidates" normally behave anionically in aqueous solutions having a pH above 7, and consequently it was expected that said "cycloimidates" when in aqueous solution together with anionic surface agents would be combined physically only and that no other reaction would occur therebetween. In the course of my experimentations, I have discovered that said "cycloimidates" could be reacted with certain anionic surface active agents at a pH above 7 to produce water-soluble reaction products. Not only did I make said discovery, but I further discovered that water solutions of such reaction products had viscosities greater than corresponding aqueous solutions of the "cycloimidates" and also exhibited better foaming characteristics than did said "cycloimidates" in very low dilutions under extreme water hardness conditions. Said reaction products are non-toxic and non-irritating to the human skin. They have been found eminently useful as general utility detergents, such as for car washing, dish washing, clothes washing, etc. Said "cycloimidates" when used as components of shampoos sometimes caused slight irritation or stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of said "cycloimidates" of the general structural Formula I are reacted with one or a combination of two or more anionic surface active agents of the following general structural Formula II to provide novel, water-soluble compounds having the following general structural Formula III, and having high wetting, detergency and surface active properties and capable of providing voluminous and stable foams in aqueous solutions, and which aqueous solutions are substantially non-irritating to the skin and eyes of normal human beings.

FORMULA II

$R_3$—COO—$R_4$—X—M

FORMULA III

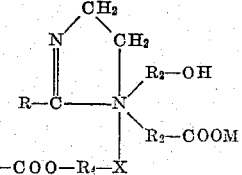

$R_3$—COO—$R_4$—X wherein $R_3$ is selected from the group consisting of aliphatic and aliphatic-aromatic hydrocarbon radicals of 6–18 carbon atoms, with the aliphatic-aromatic hydrocarbon radicals each having an aliphatic radical of at least 6 carbon atoms; $R_4$ is selected from the group consisting of (a) aliphatic hydrocarbon groups of 1–12 carbon atoms, (b) hydroxy substituted aliphatic hydrocarbon groups of 1–12 carbon atoms, (c) aliphatic ether groups, each of said groups having at least one ether linkage therein, and otherwise being hydrocarbon of 2–12 carbon atoms, (d) hydroxy substituted aliphatic ether groups, each of said groups having at least one ether linkage therein, and otherwise being hydroxy substituted hydrocarbon of 2–12 carbon atoms, (e) aliphatic groups, each group containing —CONH— and otherwise being hydrocarbon of 2–12 carbon atoms; X is a radical selected from the group consisting of —$SO_3$ and —$OSO_3$; and M is an alkali metal or its equivalent and preferably sodium or potassium; and R and $R_2$ have heretofore been defined under Formula I. It is to be understood that X as it appears in the foregoing Formulas II and III and as it appears hereafter in the description, the specific examples, and claims is either $SO_3$ or $OSO_3$ unless otherwise specified, and, in the specific examples, SO₃ may be substituted for OSO₃ and vice-versa, for they are equivalents.

Said novel reaction products, compounds of Formula III are substantially non-irritating and do not cause stinging of the eyes while compounds of Formula I as well as those of Formula II, either alone or together sometimes are irritating and always cause stinging of the eyes.

According to this invention, I react a compound of Formula I with a compound of Formula II to provide the novel and highly useful compounds of Formula III. In general this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the quaternary hydroxy of the compound of Formula I combines with the metal of the compound of Formula II to produce the metal hydroxy and the metal of the OM group of the compound of Formula I is replaced by hydrogen due to the acidic agent addition which also at least in part reacts with the formed metal hydroxy compound to form a water-soluble salt. The resultant solution can be used directly as a surface active agent, wetting agent or detergent for the purposes indicated for the "cycloimidates." While the quantities of the compound of Formula I and compound of Formula II may be equimolecular for good yield of compounds of Formula III, I may employ an excess of either, and in general the mole ratio of a compound of Formula I to a compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required so that when a compound of Formula II is added thereto, the pH of the solution of I and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition the stirring is continued and the temperature of the mass maintained for about 10–20 minutes after which the solution is allowed to cool and is a finished product. All pH measurements in the description and claims are made in the normal manner, namely at 70° F.

The following are specific examples merely given by way of illustrating the invention and are not to be taken by way of limitation, all parts being given by weight unless otherwise specified.

*Example 1*

An aqueous solution of 400 parts of the lauric "cycloimidates," of Example 1 of my heretofore identified patent, in 600 parts of water is heated to approximately 140° F. and its pH (measured electrically) is adjusted by the addition of aqueous caustic soda to 12–13. While being constantly stirred and maintained at that temperature there is added a solution of 350 parts of C₁₁H₂₃—COO—C₂H₄—SO₃—Na in 600 parts of water. Then while stirring and the temperature is maintained there is slowly added thereto hydrochloric acid solution (32%) until the pH of the mass is lowered to a value in the range of 8.2 to 8.7. Stirring is continued and the temperature maintained for about 10 minutes more. The resultant product is a solution of the novel reaction product having the following formula:

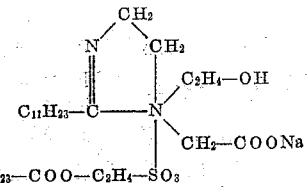

C₁₁H₂₃—COO—C₂H₄—SO₃

*Example 2*

Employ the same procedure and components as set forth in Example 1, except that only about 150 parts of

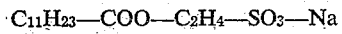

are used. In this instance, the resultant product is a solution of the reaction product whose structural formula is shown in Example 1 together with unreacted lauric "cycloimidate" used.

Employ the same procedure as that set forth in Example 1, but employ the components indicated in the following Examples 3–11; the quantity of hydrochloric acid solution (32%) is variable to lower the pH to values indicated in Example 1 to obtain the reaction products of said Examples 3–11.

*Example 3*

400 parts of lauroyl "cycloimidate" (same as Example 1) in 600 parts of water. 310 parts of C₈H₁₇—COO—CH₂(CHOH)CH₂—SO₃—Na in 600 parts of water.

FORMULA OF REACTION PRODUCT

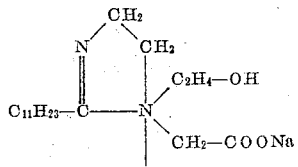

C₈H₁₇—COO—CH₂(CHOH)CH₂—SO₃

*Example 3–A*

Same procedure as that of Example 3 except that the sodium sulfate salt is used in place of the sulfonate salt of Example 3 to provide novel reaction product whose formula is exactly the same as that of the novel reaction product of Example 3, except that OSO₃ is substituted for the SO₃ therein.

*Example 4*

350 parts of caproyl "cycloimidate" of Example 3 of my hereinbefore identified patent in 650 parts of water. 330 parts of

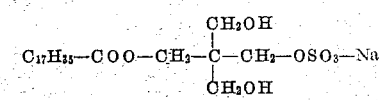

in 500 parts of water.

FORMULA OF NOVEL REACTION PRODUCT

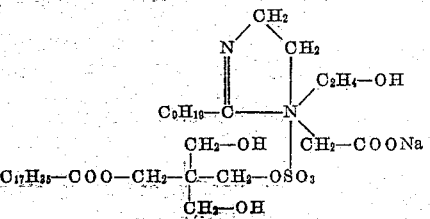

Example 5

400 parts of lauroyl "cycloimidate" (same as Example 1) in 600 parts of water. 360 parts of $$C_9H_{19}—COO—C_2H_4OC_2H_4—OSO_3—Na$$

in 600 parts of water.

FORMULA OF REACTION PRODUCT

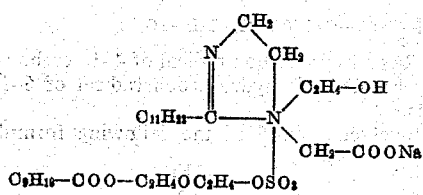

$$C_9H_{19}—COO—C_2H_4OC_2H_4—OSO_3$$

Example 6

400 parts of lauroyl "cycloimidate" (same as Example 1) in 600 parts of water. 400 parts of $$C_{11}H_{23}—COO—C_2H_4CHOHOCH_2—OSO_3—Na$$

in 600 parts of water.

FORMULA OF REACTION PRODUCT

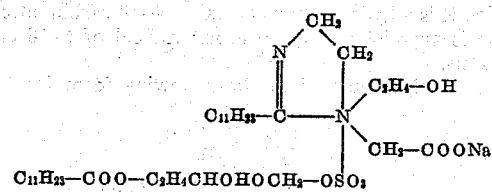

$$C_{11}H_{23}—COO—C_2H_4CHOHOCH_2—OSO_3$$

Example 7

600 parts of stearoyl "cycloimidate" of Example 6 of my hereinbefore identified patent dissolved in 900 parts of water. 500 parts of $$C_{10}H_{21}—COO—C_2H_4NHCOCH_2—SO_3—Na$$

dissolved in 750 parts of water.

FORMULA OF REACTION PRODUCT

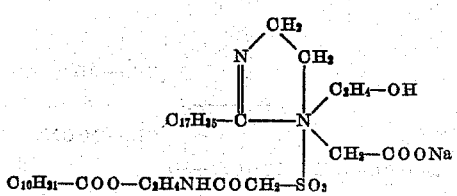

$$C_{10}H_{21}—COO—C_2H_4NHCOCH_2—SO_3$$

Example 8

450 parts of myristoyl "cycloimidate" of Example 8 of my hereinbefore identified patent dissolved in 700 parts of water. 500 parts of $$C_6H_{13}—COO—C_2H_4OC_2H_4OC_2H_4—OSO_3—Na$$

dissolved in 750 parts of water.

FORMULA OF REACTION PRODUCT

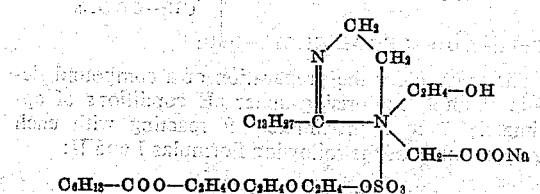

$$C_6H_{13}—COO—C_2H_4OC_2H_4OC_2H_4—OSO_3$$

Example 9

400 parts of lauroyl "cycloimidate" (same as Example 1) in 600 parts of water. 420 parts of

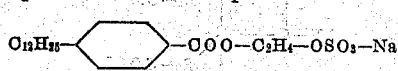

in 650 parts of water.

FORMULA OF REACTION PRODUCT

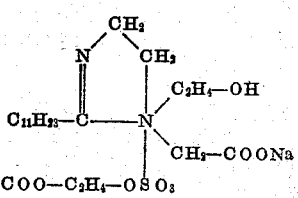

Example 10

400 parts of lauroyl "cycloimidate" (same as Example 1) in 600 parts of water. 420 parts of

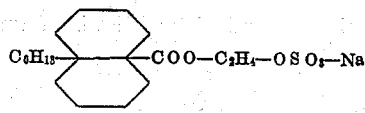

in 600 parts of water.

FORMULA OF REACTION PRODUCT

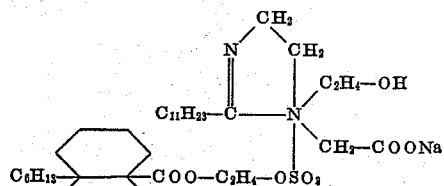

Example 11

400 parts of lauroyl "cycloimidate" (same as Example 1) in 600 parts of water. 380 parts of $$C_{11}H_{23}—COO—CH_2(CHOH)CH_2—OSO_3—Na$$

in 700 parts of water.

FORMULA OF REACTION PRODUCT

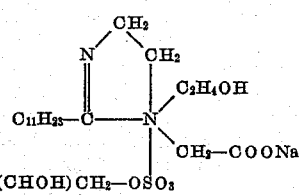

$$C_{11}H_{23}—COO—CH_2(CHOH)CH_2—OSO_3$$

The specific "cycloimidates" used in Examples 1–11 herein may be replaced by any of the other specific "cycloimidates" of my hereinbefore identified patent, such as those of Examples 2, 4, 5, 7, 10–14 therein; and in addition the specific reactants I may differ from those employed herein in the radical R which may be a hydrocarbon radical of less or more carbon atoms, but in all cases being at least 4 carbon atoms and preferably 4–18 carbon atoms, and also other hydrocarbon radicals R₃ and groups R₄ than those specifically used herein may also be employed to provide a great variety of specific compounds illustrating the present invention, also SO₃ may be substituted for OSO₃ and vice-versa.

It is to be understood that instead of first adjusting the pH of the "cycloimidate" to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may by the addition of caustic soda when required have its pH adjusted to at least 10, and then at 100–200° F. is ready for the addition of the acidic agent to lower its pH to approximately 7 to approximately 9.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

This application is a continuation-in-part of my copending application 565,538 filed February 15, 1956, now abandoned, which in turn is a continuation-in-part of my application, Serial No. 481,703, filed January 13, 1955, and since abandoned.

I claim:

1. A novel compound of the following formula:

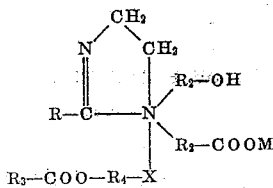

in which R is a hydrocarbon radical of 4–18 carbon atoms; $R_2$ is an organic group selected from the class consisting of (a) aliphatic hydrocarbon groups of 1–4 carbon atoms, (b) hydroxy substituted aliphatic hydrocarbon groups of 1–4 carbon atoms, (c) aliphatic ether groups, each of said groups having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms; $R_3$ is selected from the group consisting of aliphatic and aliphatic-aromatic hydrocarbon radicals, with said aliphatic radicals containing 6–18 carbon atoms, and said aliphatic-aromatic radicals selected from the class of benzene and naphthalene rings, each having an aliphatic radical of 6–18 carbon atoms attached thereto; $R_4$ is an organic group selected from the class consisting of (g) aliphatic hydrocarbon groups of 1–12 carbon atoms, (h) hydroxy substituted aliphatic hydrocarbon groups of 1–12 carbon atoms, (i) aliphatic ether groups, each of said groups having at least one ether linkage therein and otherwise being hydrocarbon of 2–12 carbon atoms, (j) hydroxy substituted ether groups, each of said groups having at least one ether linkage therein and otherwise being hydroxy substituted hydrocarbon of 2–12 carbon atoms, (k) aliphatic groups, each of said groups containing CONH and otherwise being hydrocarbon of 2–12 carbon atoms; X is selected from the group consisting of $SO_3$ and $OSO_3$; and M is an alkali metal.

2. A novel compound of the following formula:

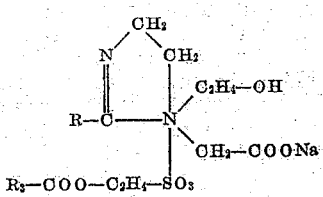

in which R is a hydrocarbon radical of 4–18 carbon atoms and $R_3$ is an aliphatic hydrocarbon radical of 6–18 carbon atoms.

3. A novel compound of the following formula:

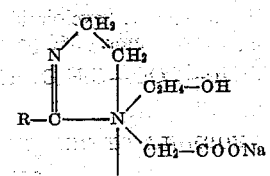

in which R is a hydrocarbon radical of 4–18 carbon atoms and $R_3$ is an aliphatic hydrocarbon radical of 6–18 carbon atoms.

4. A novel compound of the following formula:

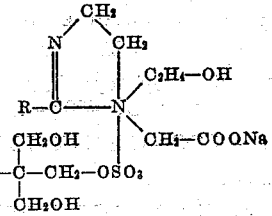

in which R is a hydrocarbon radical of 4–18 carbon atoms and $R_3$ is an aliphatic hydrocarbon radical of 6–18 carbon atoms.

5. A novel compound of the following formula:

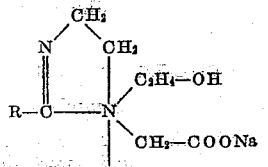

in which R is a hydrocarbon radical of 4–18 carbon atoms and $R_3$ is an aliphatic hydrocarbon radical of 6–18 carbon atoms.

6. A novel compound of the following formula:

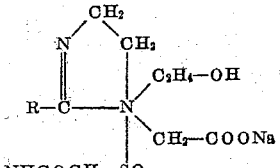

in which R is a hydrocarbon radical of 4–18 carbon atoms and $R_3$ is an aliphatic hydrocarbon radical of 6–18 carbon atoms.

7. A novel compound of the following formula:

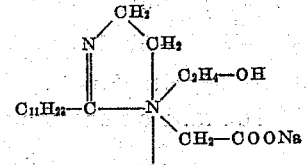

8. The method for the preparation of a compound defined in claim 1, comprising under pH conditions of approximately 7 to approximately 9 reacting with each other compounds of the following Formulas I and II:

FORMULA I

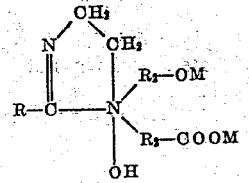

FORMULA II $$R_3—COO—R_4—X—M$$

in which R is a hydrocarbon radical of 4–18 carbon atoms; $R_2$ is an organic group selected from the class consisting of (a) aliphatic hydrocarbon groups of 1–4 carbon atoms, (b) hydroxy substituted aliphatic hydrocarbon groups of 1–4 carbon atoms, (c) aliphatic ether groups, each of said groups having a single ether linkage therein and otherwise being hydrocarbon of 2–4 carbon atoms, (d) aliphatic ether groups, each of said groups having a single ether linkage therein and otherwise being hydroxy substituted hydrocarbon of 2–4 carbon atoms, (e) aliphatic keto groups, each of said groups having a single keto linkage therein and otherwise being hydrocarbon of 2–4 carbon atoms, (f) aliphatic keto groups, each of said groups having a single keto linkage therein and otherwise being hydroxy substituted hydrocarbon of 2–4 carbon atoms; $R_3$ is selected from the group consisting of aliphatic and aliphatic-aromatic hydrocarbon radicals, with said aliphatic radicals containing 6–18 carbon atoms, and said aliphatic-aromatic radicals selected from the class of benzene and naphthalene rings, each having an aliphatic radical of 6–18 carbon atoms attached thereto; $R_4$ is an organic group selected from the class consisting of (g) aliphatic hydrocarbon groups of 1–12 carbon atoms, (h) hydroxy substituted aliphatic hydrocarbon groups of 1–12 carbon atoms (i), aliphatic ether groups, each of said groups having at least one ether linkage therein and otherwise being hydrocarbon of 2–12 carbon atoms, (j) hydroxy substituted ether groups, each of said groups having at least one ether linkage therein and otherwise being hydroxy substituted hydrocarbon of 2–12 carbon atoms, (k) aliphatic groups, each of said groups containing CONH and otherwise being hydrocarbon of 2–12 carbon atoms; X is selected from the group consisting of $SO_3$ and $OSO_3$; and M is an alkali metal.

9. The method comprising to a solution containing a compound of Formula I and a compound of Formula II both defined in claim 8, adding a quantity of an acidic agent to lower the pH thereof to a value of approximately 7 to approximately 9 and maintaining the temperature of the mass between about 100° F. and 200° F.

10. The method comprising to a solution whose pH is at least 10 and containing a compound of Formula I and a compound of Formula II both defined in claim 8, adding a quantity of an acidic agent to lower the pH thereof to a value of approximately 7 to approximately 9 and maintaining the temperature of the mass between about 100° F. and 200° F.

11. The method defined in claim 8, with the mole ratio of compound of Formula I to compound of Formula II being 2 moles of the former to 1–3 moles of the latter.

12. The method defined in claim 10, with the mole ratio of compound of Formula I to compound of Formula II being 2 moles of the former to 1–3 moles of the latter.

13. The method defined in claim 10, with the mole ratio of compound of Formula I to compound of Formula II being 2 moles of the former to 1–3 moles of the latter.

No references cited.